United States Patent
Myers et al.

(10) Patent No.: US 10,830,914 B2
(45) Date of Patent: Nov. 10, 2020

(54) PASSIVE SOUND SOURCE CLASSIFICATION AND LOCALIZATION

(71) Applicant: Ford Global Technologies, LLC, Dearborn, MI (US)

(72) Inventors: Scott Myers, Camarillo, CA (US); Alexander Groh, Detroit, MI (US); Ramchandra Karandikar, Sunnyvale, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 316 days.

(21) Appl. No.: 15/916,093

(22) Filed: Mar. 8, 2018

(65) Prior Publication Data

US 2019/0277986 A1    Sep. 12, 2019

(51) Int. Cl.
| | |
|---|---|
| *G01V 1/00* | (2006.01) |
| *G10K 11/00* | (2006.01) |
| *G10K 11/26* | (2006.01) |
| *G01H 3/08* | (2006.01) |
| *G01S 15/931* | (2020.01) |

(52) U.S. Cl.
CPC .............. *G01V 1/001* (2013.01); *G01H 3/08* (2013.01); *G10K 11/004* (2013.01); *G10K 11/26* (2013.01); *G01S 15/931* (2013.01); *G01S 2015/938* (2013.01)

(58) Field of Classification Search
CPC ...... G01V 1/001; G10K 11/004; G10K 11/26; G01S 15/931; G01S 2015/938; G01H 3/08
See application file for complete search history.

(56) References Cited

U.S. PATENT DOCUMENTS

| | | | |
|---|---|---|---|
| 5,434,927 A | 7/1995 | Brady | |
| 5,619,616 A | 4/1997 | Brady | |
| 7,260,022 B2 | 8/2007 | Schliep | |
| 8,164,484 B2 | 4/2012 | Berger | |
| 8,787,113 B2 * | 7/2014 | Turbahn | G06F 3/0346 367/118 |
| 10,150,414 B2 * | 12/2018 | Myers | H04N 7/18 |
| 10,286,228 B2 * | 5/2019 | Bharat | A61N 5/1038 |

(Continued)

FOREIGN PATENT DOCUMENTS

| | | | | |
|---|---|---|---|---|
| CN | 110244306 A | * | 9/2019 | ............. G10K 11/26 |
| DE | 102019105440 A1 | * | 9/2019 | ............... G01H 3/08 |

(Continued)

OTHER PUBLICATIONS

Vehicle classification using neural networks with a single magnetic detector.

*Primary Examiner* — Daniel Pihulic
(74) *Attorney, Agent, or Firm* — David R. Stevens; Stevens Law Group

(57) ABSTRACT

A method for processing audible sounds using ultrasonic sensors. The method includes passively monitoring, via ultrasonic sensors, an external environment for a audible sounds. An audible sound may be detected and used to produce a sound signal. The sound signal may be filtered to determine one or more features corresponding thereto, including a class, a position, and a velocity. A priority may be assigned to the sound signal based on the sound signal to determine an appropriate response. A corresponding system and computer program product are also disclosed and claimed herein.

18 Claims, 7 Drawing Sheets

(56) References Cited

U.S. PATENT DOCUMENTS

| | | | |
|---|---|---|---|
| 2010/0110273 A1* | 5/2010 | Turbahn | G06F 3/0346 |
| | | | 348/348 |
| 2017/0188157 A1* | 6/2017 | Park | H04R 3/06 |
| 2019/0277986 A1* | 9/2019 | Myers | G10K 11/004 |

FOREIGN PATENT DOCUMENTS

| | | |
|---|---|---|
| EP | 1990650 A1 | 11/2008 |
| JP | 2002245588 A | 8/2002 |

* cited by examiner

PASSIVE SOUND SOURCE CLASSIFICATION AND LOCALIZATION

BACKGROUND

Field of the Invention

This invention relates to sound processing for vehicles.

Background of the Invention

Ultrasonic proximity sensors are quickly becoming standard fare on modern vehicles. These sensors are typically implemented on the front and/or rear bumpers of vehicles to assist with vehicle parking and obstacle avoidance. Each sensor actively emits acoustic pulses and then measures the return interval of each reflected signal to determine distances to nearby objects. If objects are within a predetermined proximity range, the sensor system alerts the driver to possible danger via audible sounds, visible aids, and/or tactile indications.

While ultrasonic transducers have broad general application, ultrasonic proximity sensors for vehicles are typically only triggered by slow vehicle speeds (for front sensors), or by selecting a reverse gear (for rear sensors). In this manner, such sensors are automatically activated to facilitate navigating into and out of parking spaces while avoiding nuisance warnings during driving. This mode of operation, however, effectively limits the usefulness of such sensors to parking situations, as such sensors are not equipped to inform or influence vehicle behavior at normal driving speeds.

Many traffic conditions and obstacles encountered at normal driving speeds are associated with audible noises such as crashes, screeches, engine sounds, horns, sirens, railroad crossing bells, and the like. These noises may inform drivers of potentially dangerous situations, even before the particular condition or obstacle may be seen. These audible warnings may be inadequate, however, to entirely prevent potentially hazardous encounters. Indeed, human drivers are notoriously prone to making errors of judgment, inherently limited by their inattentiveness, distractions, and/or inability to process relevant information quickly and accurately.

In view of the foregoing, what are needed are systems and methods to automatically identify and localize sounds associated with traffic conditions and obstacles encountered under normal driving conditions. Ideally, such systems and methods would utilize existing ultrasonic sensors to capture incident audible sounds to detect objects or obstacles corresponding to such sounds that may be obstructed or not directly visible. Such systems and methods would also and identify and localize multiple objects substantially simultaneously, assign a priority to each, and determine an appropriate vehicle response based on that priority.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
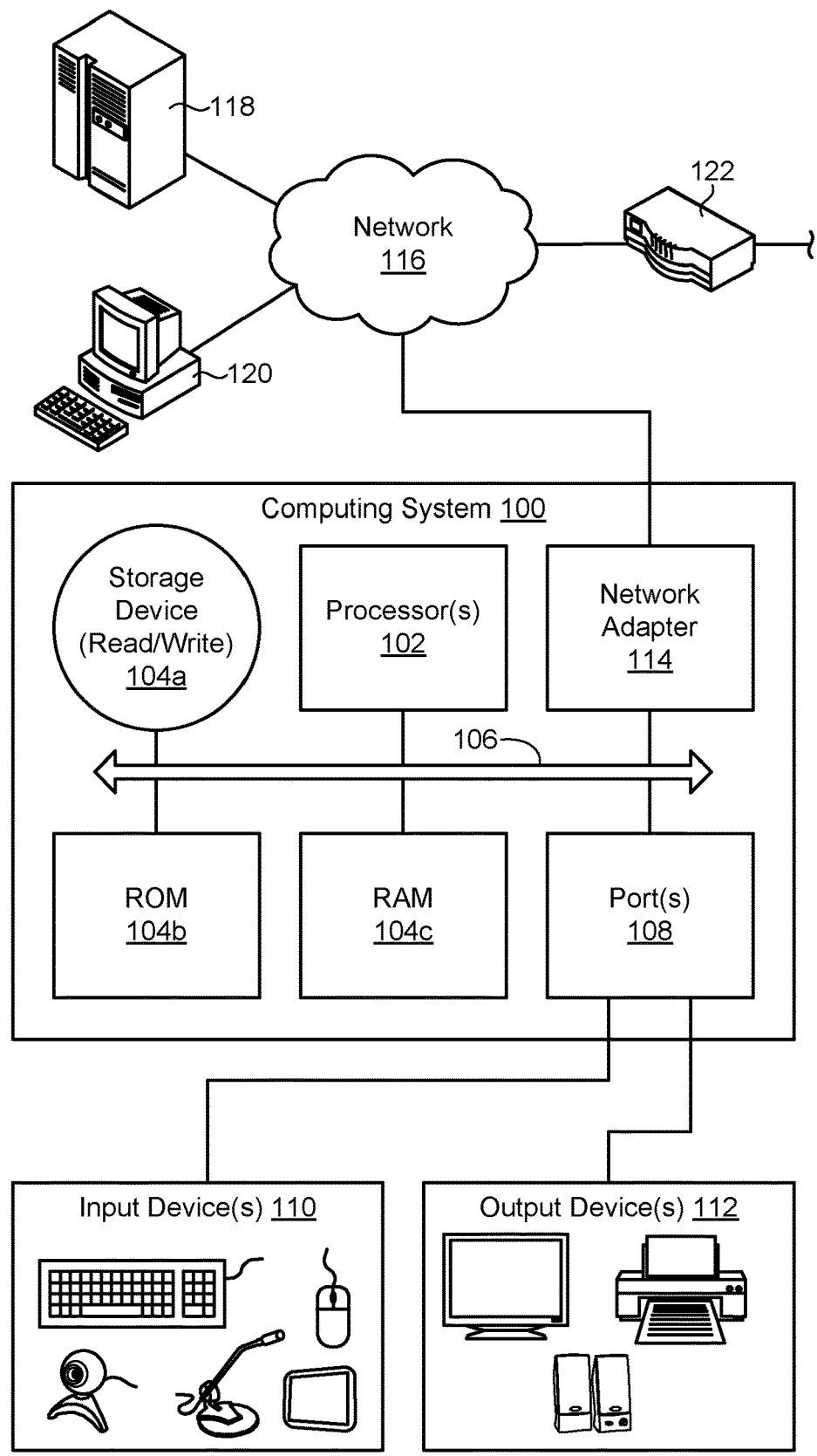
FIG. 1 is a high-level block diagram showing one example of a computing system in which a system and method in accordance with the invention may be implemented.

Referring to FIG. 1, one example of a computing system 100 is illustrated. The computing system 100 is presented to show one example of an environment where a system and method in accordance with the invention may be implemented. The computing system 100 may be embodied as a mobile device 100 such as a smart phone or tablet, a desktop computer, a workstation, a server, or the like. The computing system 100 is presented by way of example and is not intended to be limiting. Indeed, the systems and methods disclosed herein may be applicable to a wide variety of different computing systems in addition to the computing system 100 shown. The systems and methods disclosed herein may also potentially be distributed across multiple computing systems 100.

As shown, the computing system 100 includes at least one processor 102 and may include more than one processor 102. The processor 102 may be operably connected to a memory 104. The memory 104 may include one or more non-volatile storage devices such as hard drives 104a, solid state drives 104a, CD-ROM drives 104a, DVD-ROM drives 104a, tape drives 104a, or the like. The memory 104 may also include non-volatile memory such as a read-only memory 104b (e.g., ROM, EPROM, EEPROM, and/or Flash ROM) or volatile memory such as a random access memory 104c (RAM or operational memory). A bus 106, or plurality of buses 106, may interconnect the processor 102, memory devices 104, and other devices to enable data and/or instructions to pass therebetween.

To enable communication with external systems or devices, the computing system 100 may include one or more ports 108. Such ports 108 may be embodied as wired ports 108 (e.g., USB ports, serial ports, Firewire ports, SCSI ports, parallel ports, etc.) or wireless ports 108 (e.g., Bluetooth, IrDA, etc.). The ports 108 may enable communication with one or more input devices 110 (e.g., keyboards, mice, touchscreens, cameras, microphones, scanners, storage devices, etc.) and output devices 112 (e.g., displays, monitors, speakers, printers, storage devices, etc.). The ports 108 may also enable communication with other computing systems 100.

In certain embodiments, the computing system 100 includes a wired or wireless network adapter 114 to connect the computing system 100 to a network 116, such as a LAN, WAN, or the Internet. Such a network 116 may enable the computing system 100 to connect to one or more servers 118, workstations 120, personal computers 120, mobile computing devices, or other devices. The network 116 may also enable the computing system 100 to connect to another network by way of a router 122 or other device 122. Such a router 122 may allow the computing system 100 to communicate with servers, workstations, personal computers, or other devices located on different networks.

As previously mentioned, ultrasonic proximity sensors are commonly implemented on modern vehicles to facilitate parking and obstacle avoidance. Typical sensor operation involves actively emitting an acoustic pulse and measuring the return interval of the reflected signal, which may be automatically triggered by slow vehicle speeds and/or putting the vehicle into reverse. Such sensors are ill-equipped, however, to inform or influence vehicle behavior at normal driving speeds. Embodiments of the invention address this issue by utilizing ultrasonic sensors to passively detect and monitor audible and inaudible sounds during normal driving conditions. Embodiments of the invention may also classify and prioritize such sounds to determine an appropriate vehicle response.

As used herein, the term "vehicle" refers to any autonomous, semi-autonomous, or non-autonomous motorized vehicle, including a heavy-duty industrial or transport vehicle, bus, truck, car, cart, airplane, train, and the like. The term "ultrasonic sensor" refers to any transmitter, receiver and/or transceiver, including a microphone, configured to convert ultrasound and/or audible sound into an electrical signal.

Figure 2:
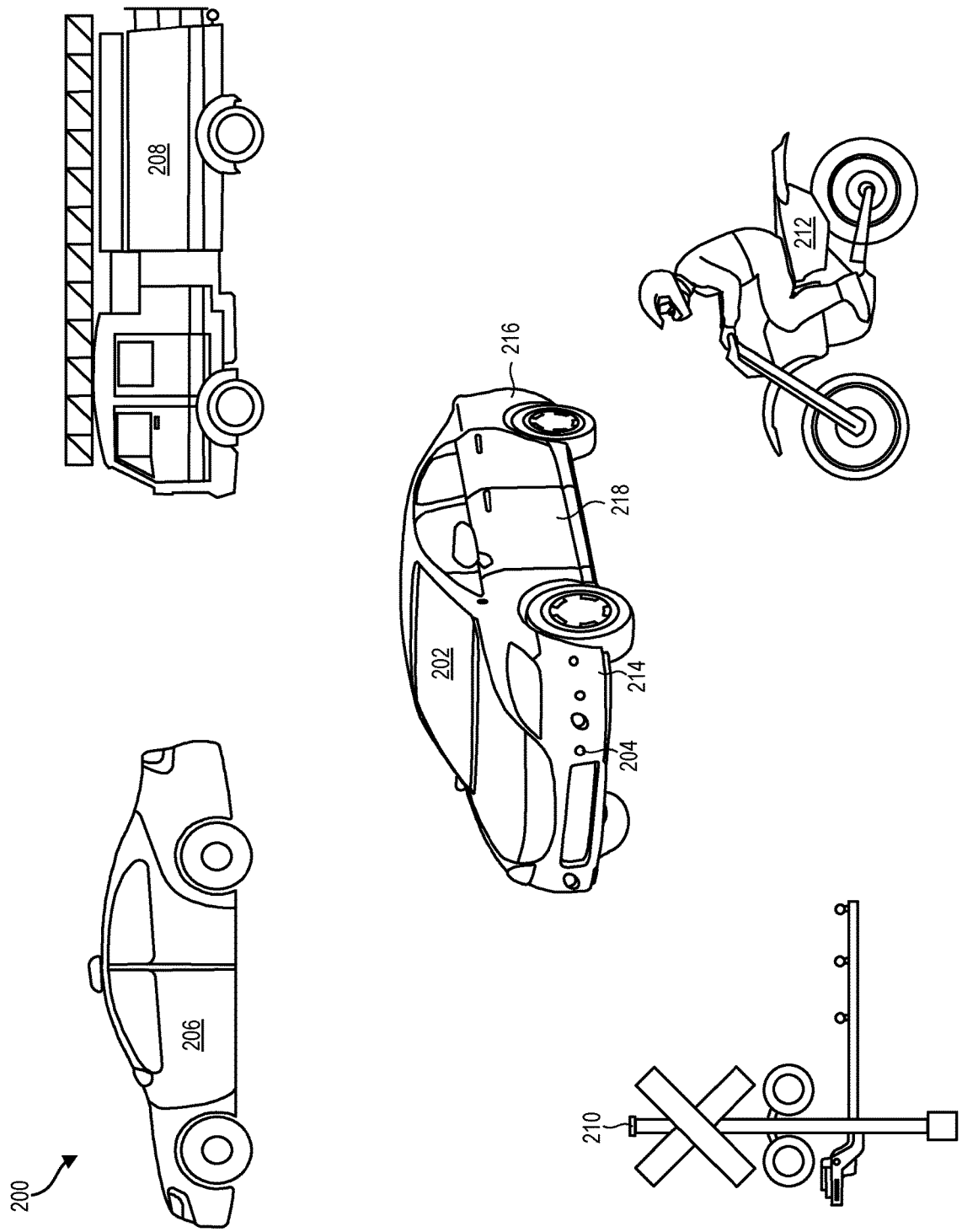
FIG. 2 is a high level schematic diagram showing various obstacles or hazards that may be identified and localized in accordance with certain embodiments of the invention.

Referring now to FIG. 2, a system 200 for passively identifying and localizing audible and/or inaudible sounds in accordance with the invention may include a vehicle 202 having an array of onboard ultrasonic sensors 204. As shown, the vehicle 202 may include an array of ultrasonic sensors 204 disposed on its front 214 and/or rear bumpers 216. In one embodiment, the vehicle 202 may include a total of twelve (12) ultrasonic sensors 204: four (4) on the front bumper 214, four (4) on the rear bumper 216, and two (2) on each side 218.

At slow speeds (such as during parking or reversing), each ultrasonic sensor 204 onboard a vehicle 202 may actively emit ultrasonic frequencies to detect obstacles within its line of sight. Advantageously, ultrasonic sensors 204 in accordance with embodiments of the present invention may also passively monitor an external environment for incident sounds within an audible range. Passive sensing of the external environment by more than one ultrasonic sensor 204 in this manner may enable detection and monitoring of more than one sound substantially simultaneously. These sounds may be captured by the ultrasonic sensors 204 and analyzed to detect objects and obstacles corresponding to such sounds, as discussed in more detail below. Importantly, ultrasonic sensors 204 utilized in this manner may detect objects and obstacles that may be fully or partially obstructed, or not directly visible to the vehicle 202.

Other vehicular traffic, and particularly emergency vehicles and motorcycles 212, pose some of the greatest safety threats to vehicles 202 on the road. For this reason, almost all vehicles 202 are equipped with mechanisms capable of producing distinct noises to warn other vehicles 202 of potential danger. For example, sirens on police cars 206, fire engines 208, ambulances, and other emergency vehicles readily identify such vehicles and warn other vehicles of potential danger. Likewise, the loud engine sounds produced by a motorcycle 212 are discernable almost immediately, while the bells of a railroad crossing barrier 210 are widely recognized as announcing an impending train.

Despite these built-in audible warning systems, such audible noises and sounds are typically ignored by ultrasonic sensors 204 onboard a vehicle 202, as such ultrasonic sensors 204 are unable to process them in a useful way. Beneficially, embodiments of the present invention may utilize existing ultrasonic sensors 204 to capture and analyze incident environmental sounds, thus enabling vehicles 202 to detect and avoid associated obstacles and accidents.

In addition, certain embodiments of the invention may utilize ultrasonic sensors 204 in combination with other sensing modalities such as camera sensors, Lidar sensors, radar sensors, global positioning systems, and the like, to ensure robust and reliable detection and localization of objects. In one embodiment, a confidence score may be generated for a detected object based on the presence or absence of corroborating evidence received from other types of sensors, or from ultrasonic sensors 204 associated with other vehicles 202. Information that fails to meet a predetermined confidence score threshold may be ignored.

In certain embodiments, detected objects may be assigned a priority score for localization and/or tracking. The priority score may be specific to an individual vehicle 202, depending on that vehicle's 202 location and course of travel relative to the detected object. For example, the priority score may be based on a category of classification (i.e., emergency vehicles may be assigned a higher priority than other vehicles), initial position estimates (i.e., closer objects may be prioritized over objects that are farther away), current traffic conditions and policies (i.e., objects with a course of travel away from the vehicle 202 may be assigned a lower priority than objects with a course of travel towards the vehicle 202), and expectation of the existence of the object (i.e., entry barrier to a railway crossing may be assigned a higher priority if the vehicle 202 expects to cross a railroad in the near future). In certain embodiments, the system 200 may interface with known train schedules, bus schedules, and the like to determine an expectation of the existence of the object.

In some embodiments, objects having priority scores above a certain predetermined threshold may be tracked by a vehicle 202. The predetermined threshold for priority scores may be pre-defined, and may change depending on vehicle 202 configuration as well as prevailing traffic conditions. As discussed in more detail below, the vehicle 202 may track objects by monitoring their position estimates relative to the vehicle 202 over time.

Figure 3:
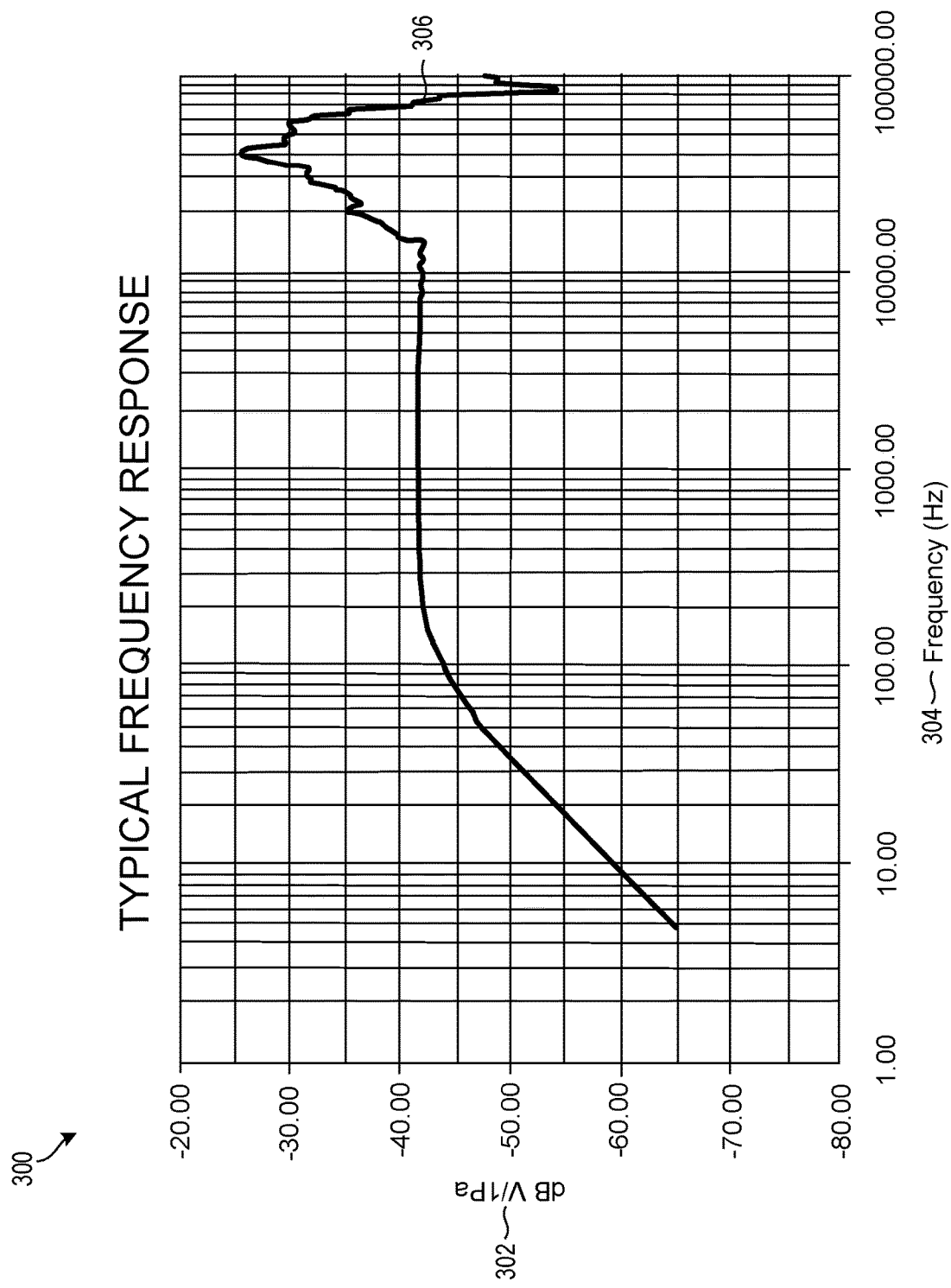
FIG. 3 is a graph of a typical frequency response for ultrasonic sensors utilized in accordance with certain embodiments of the invention.

Referring now to FIG. 3, embodiments of the invention may produce a sound signal 306 corresponding to each sound captured by at least one ultrasonic sensor 204. Various filtering techniques, such as a fast Fourier transform ("FFT") or bandpass filters, may be applied to convert an incoming sound from its original domain to a representation in the frequency domain 304. The resulting sound signal 306 or associated frequency domain values may then be passed through a pre-trained classification model, such as a neural network for additional analysis.

Specifically, embodiments of the invention may utilize neural networks to build predictions of different classes of sound sources, and then assign incoming sound signals 306 to such classes. In some embodiments, the present invention may classify incoming sound signals 306 into various object categories based on their associated frequencies. Object categories may include, for example, passenger vehicles, motorcycles, police cars on active duty, fire engines on active duty, railroad crossings, or any other such category known to those in the art.

FIG. 3 is a graph 300 illustrating typical sensitivity responses 302 of ultrasonic sensors to received frequency domain values 304. As shown, ultrasonic sensors demonstrate strong sensitivity to operating frequency values 304 in a range of 50 kHz-100 kHz. However, such ultrasonic sensors also demonstrate reasonable sensitivity from 100 Hz-20 kHz, which spans most of the generally accepted range of audible frequencies (i.e., 20 Hz-20 kHz).

Upon detecting and classifying sound signals 306 received from multiple ultrasonic sensors within this frequency 304 range, various types of signal processing algorithms may be performed to identify and localize a source of each sound signal 306 (such as an object or obstacle) in accordance with embodiments of the invention. Signal processing algorithms associated with beamforming, source localization, and noise reduction may be used to assign initial position estimates and velocity estimates to multiple objects substantially simultaneously. In addition, certain embodiments may track objects over time and use extrapolation techniques, such as Doppler extrapolation, to estimate a trajectory for the object.

In certain embodiments, a position estimate of an object may be calculated based on passively monitoring sound signals 306 captured by multiple ultrasonic sensors 204. Beamforming techniques may be used to combine sound signals 306 from multiple ultrasonic sensors in such a way that sound signals 306 at particular angles experience constructive interference, while others experience destructive interference. In this manner, beamforming may be used to estimate the location of the source of the sound signal 306 by means of optimal spatial filtering and interference rejection. This location estimate may be refined with more sound signals 306 sampled across time.

In one embodiment, a synthetic aperture-type setup may be used in addition to signal processing to fuse voltage signals received from the same set of ultrasonic sensors at different points in time. This may result in a more robust system able to localize sound sources that emit most of their sound signals 306 in lower frequency bands. In some embodiments, Kalman filter methods or linear quadratic estimation methods may be applied to a series of location estimates to predict velocities for the sound sources or objects of interest.

Figure 4:
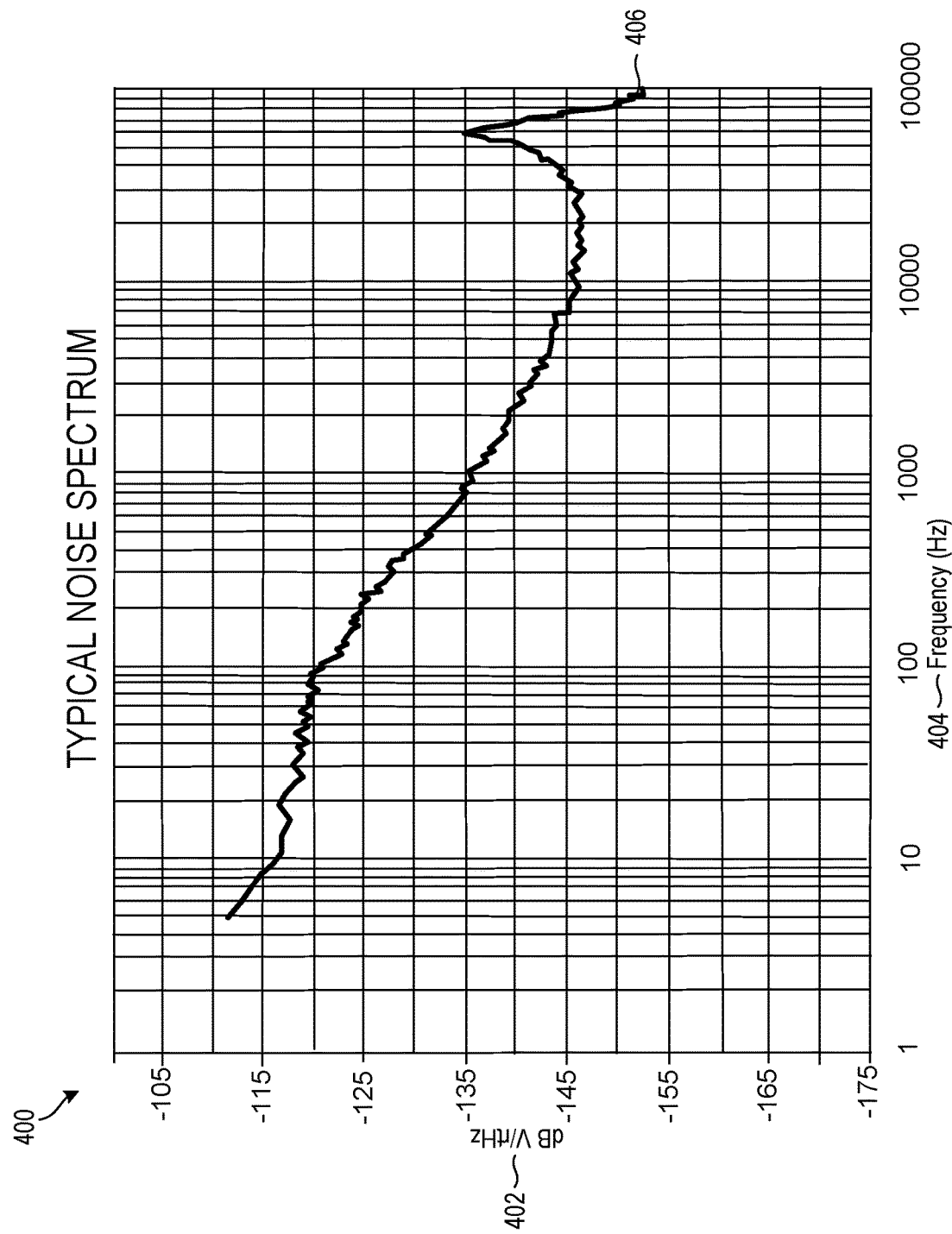
FIG. 4 is a graph of a typical noise spectrum for sounds received by ultrasonic sensors in accordance with certain embodiments of the invention.

FIG. 4 is a graph 400 of a typical noise spectrum, demonstrating significantly higher noise 406 levels at lower frequencies 404. All materials produce noise 406 at a power level 402 proportional to the physical temperature of the material, and all recording devices, including ultrasonic sensors 204, have traits that make them susceptible to noise 406. Some embodiments of the invention may perform probabilistic noise 406 reduction techniques to facilitate a higher signal to noise 406 ratio. These techniques may be particularly helpful to clean up sound signals at lower frequencies 404, thereby producing a best estimate of the true state of the signal. Probabilistic noise 406 reduction techniques may be based on a Gaussian probabilistic mathematical model, or any other probabilistic model known to those in the art.

Probabilistic noise 406 reduction techniques may include, for example, compander-based noise reduction systems, dynamic noise limiter or dynamic noise reduction, spectral editing tools, and other such techniques and noise reduction software programs known to those in the art. Such techniques may be performed on an incoming sound signal 306 to generate a "clean" sound signal.

In certain embodiments, information including the clean sound signal 306, classification assigned to the sound signal 306, and direction of the source of the sound signal 306, may be communicated to a cloud-based processor or server for further processing. The processor or server may geocode the information and assign a time stamp to precise ego vehicle localization information. In some embodiments, information from onboard ultrasonic sensors associated with more than one vehicle 202 may be communicated to and processed by the processor or server. The combined information from multiple detection sources may facilitate increased accuracy and reliability of object identification and localization.

Figure 5:
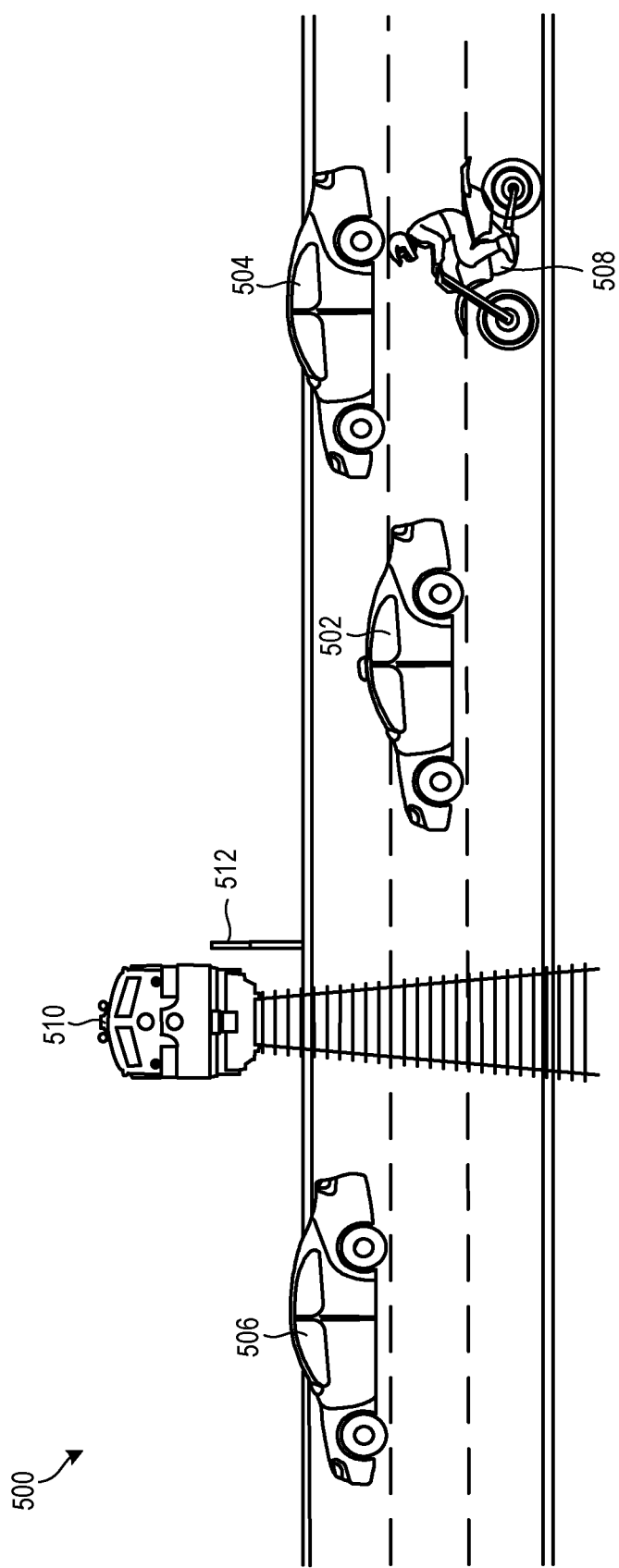
FIG. 5 is a perspective view of a traffic situation where obstacles may be identified and localized in accordance with certain embodiments of the invention.

Referring now to FIG. 5, a system 500 in accordance with the present invention may identify and localize objects and obstacles in a traffic situation. As shown, heavy vehicle traffic, including a motorcycle 508, may be flowing from right to left, while a train 510 approaches an entry barrier 512 intersecting traffic. Embodiments of the present invention may utilize onboard or ancillary ultrasonic sensors to detect and identify potentially dangerous obstacles and situations, including the impending train 510 and the motorcycle 508.

In some embodiments, this information may be shared between vehicles 502, 504, 506 over a wireless network such as V2V communications systems, or other dedicated short-range communications ("DSRC") systems known to those in the art. Information may be shared with vehicles 502, 504, 506 according to their proximity to the object or obstacle, or upon user request.

In one embodiment, for example, an array of ultrasonic sensors 204 associated with the first vehicle 506 may detect the entry barrier 512. This information, in addition to information from other data sources such as GPS and predetermined maps, may be passed to vehicles 502, 504 that have not yet encountered the entry barrier 512, and to other vehicles in the vicinity. Using the filtered information received from the first vehicle 506, the other vehicles 502 and 504 may receive a more refined estimate of the location of the entry barrier 512. Such other vehicles 502, 504 may also use the information received from the first vehicle 506 to actively track the entry barrier 512, since it is a high-priority object.

In some embodiments, information from the ultrasonic sensors 204 of the first vehicle 506 may override information received from other data sources. For example, sensor 204 information from the first vehicle 506 indicating that a train 510 is approaching may override information from other GPS sources indicating that the railroad barrier 512 is up. This safety override may be critical where, as in this example, the entry barrier 512 may have malfunctioned and later vehicles 502, 504 would not be privy to such information but for the data from the first vehicle 506.

Other vehicles in the vicinity may also receive the information but selectively ignore it by not localizing and/or tracking the entry barrier 512. The decision to ignore such information may be based on the priority score assigned to the entry barrier 512 for the vehicle. Indeed, the entry barrier 512 may be assigned a lower priority score for vehicles farther away from the entry barrier 512 or for vehicles traveling in an opposite direction, such as those that have already passed the entry barrier 512.

In another embodiment, vehicles 502, 504 close to the motorcycle 508 may detect the motorcycle 508 and propagate associated information to the first vehicle 506 and other vehicles in the immediate vicinity. In this manner, the first vehicle 506 may receive a more refined estimate of the position and velocity of the motorcycle 508 based on information generated by ultrasonic sensors 204 onboard vehicles 502, 504 positioned closer to the motorcycle 508. All of the vehicles 502, 504, 506 proximate the motorcycle 508 may actively track the motorcycle 508, since it is a high-priority object.

Figure 6:
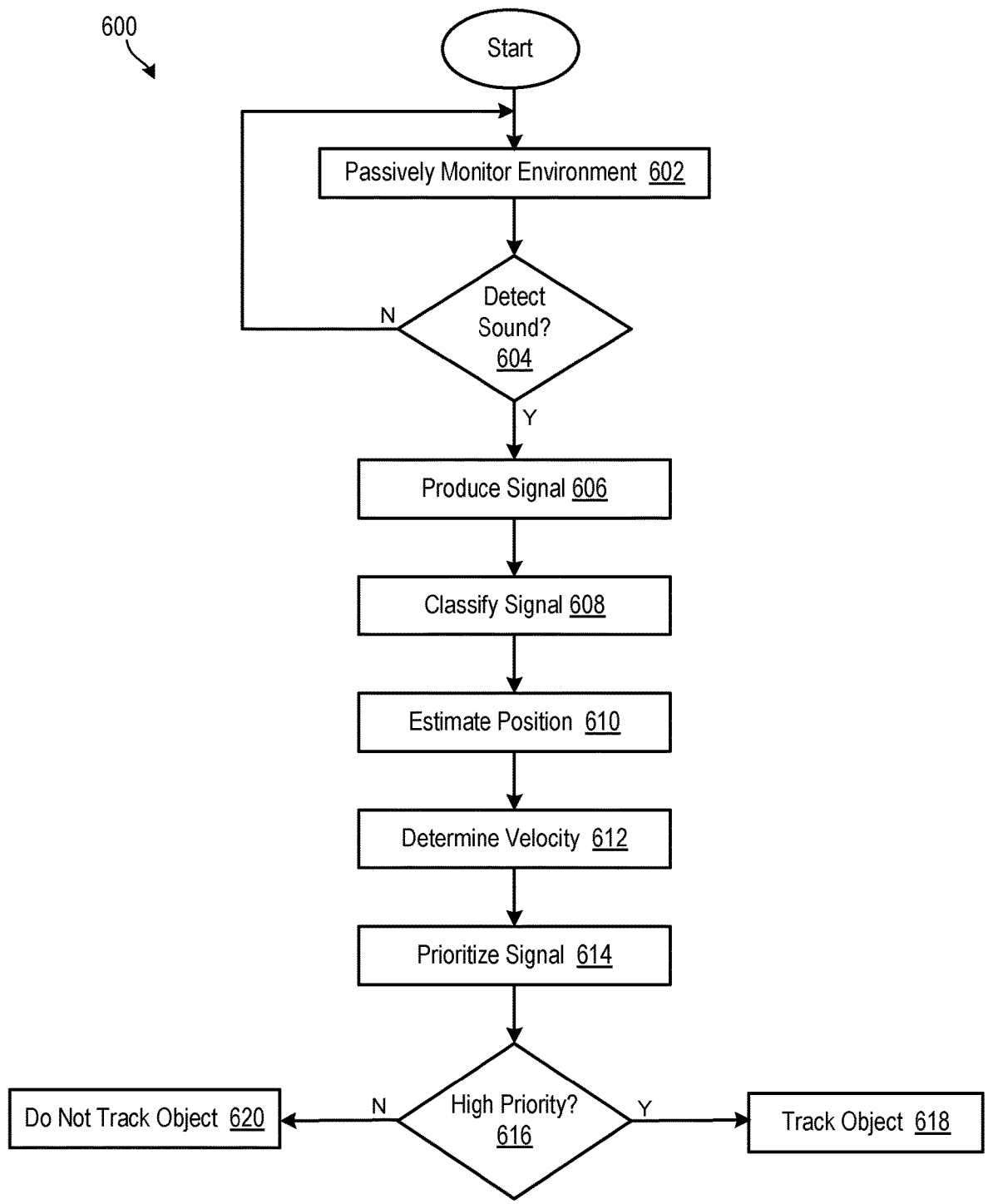
FIG. 6 is a flow chart showing a process for identifying and localizing sounds in accordance with certain embodiments of the invention.

Referring now to FIG. 6, a method 600 for identifying and localizing sounds in accordance with embodiments of the invention may include utilizing ultrasonic sensors to passively monitor 602 an external environment for audible sounds. In certain embodiments, ultrasonic sensors may be coupled to or associated a vehicle and may monitor 602 the external environment substantially continuously for sounds. If no sound is detected 604, the ultrasonic sensors may continue to passively monitor 602 the external environment. If a sound is detected 604, the sound may be converted from its original domain to produce 606 a sound signal in a frequency domain.

The sound signal may then be filtered and classified 608 into one or more sound source or object categories. Object categories may be defined by frequency ranges or other sound signal characteristics typically associated with particular objects. As mentioned previously, object categories may include passenger vehicles, motorcycles, police cars on active duty, fire engines on active duty, railroad crossings, or any other such category known to those in the art.

The incoming sound signal may be further analyzed to determine or estimate 610 a location and/or position of the object or sound source, and to determine 612 a velocity of the object. Determining 612 a velocity of the object may be important, for example, where the object (e.g., a motorcycle) is approaching a vehicle at double the vehicle's speed. In the absence of a direct line of sight between the vehicle and the motorcycle, the motorcycle may be difficult to localize and a closing rate between the vehicle and the motorcycle may be impossible to determine. Embodiments of the invention may overcome such difficulties by performing a velocity calculation 612 to enable the receiving vehicle to automatically assess the situation quickly and accurately, and to automatically initiate an appropriate response. In this manner, embodiments of the invention may the vehicle to avoid a collision or other interference with the motorcycle.

Some embodiments of the invention may prioritize 614 a sound signal based on its corresponding classification 608, position 610, velocity 612, and/or any other feature or characteristic known to those in the art. In certain embodiments, as discussed in more detail with reference to FIG. 7 below, prioritizing 614 a sound signal may include assigning a priority score to the sound. The priority score may be compared to a predetermined threshold to determine 616 whether the sound signal is associated with a high-priority object. If so, the object may be tracked 618 until the risk of danger has passed. If not, the object may not be tracked 620.

Figure 7:
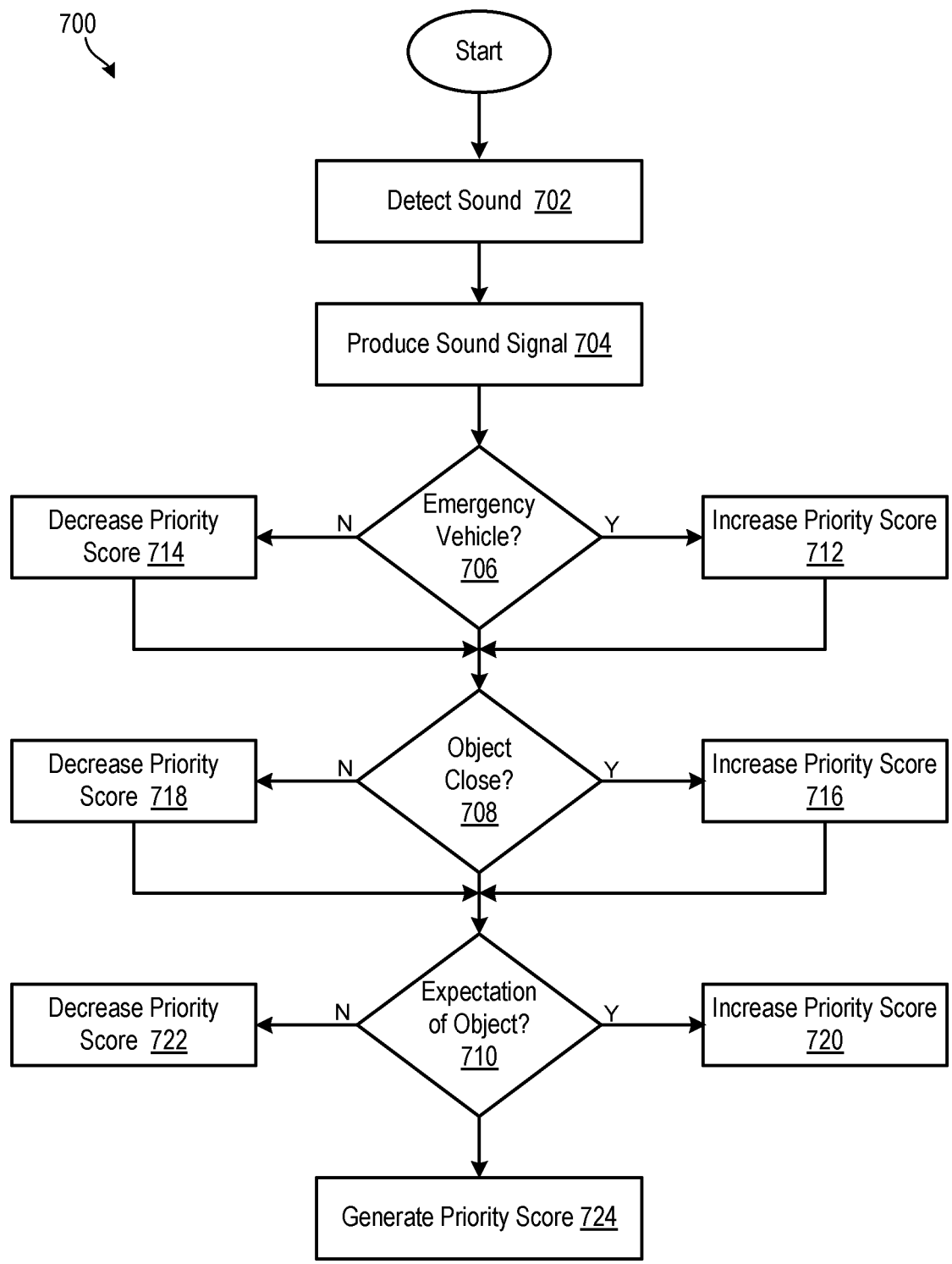
FIG. 7 is a flow chart showing a process for prioritizing sounds in accordance with embodiments of the invention.

Referring now to FIG. 7, a process 700 for prioritizing sounds in accordance with embodiments of the invention may include detecting 702 a sound utilizing one or more ultrasonic sensors onboard or otherwise associated with a vehicle. The sound may be converted from its original domain to produce 704 a sound signal in a frequency domain. The sound signal may be filtered and analyzed to determine 706 whether the sound signal corresponds to an emergency vehicle. If yes, an associated priority score may be increased 712. If no, the associated priority score may be unchanged or decreased 714.

The sound signal may be further analyzed to determine 708 whether the object is within a predetermined distance with respect to the vehicle and/or its associated ultrasonic sensors. If yes, the priority score for the object may be increased 716. If not, the priority score may be unchanged or decreased 718.

Finally, the sound signal may be analyzed to determine 710 whether an encounter with the object is expected 710. For example, embodiments of the present invention may utilize a global positioning system and/or other sensors such as cameras, lidar, radar, and the like, to predict an encounter with an object, such as an entry barrier to a railway crossing. In some embodiments, sensor data may be used in combination with data from other sources, such as public transportation schedules or emergency vehicle projected paths based on source/origin and sink/destination. If there is an expectation of an object where, for example, the object has been identified by GPS data or predetermined maps, then the priority score may be increased 720. If not, the priority score may be unchanged or decreased 722. A final priority score may then be generated 724 and used to determine an appropriate vehicle response, as discussed above.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method comprising:
   passively monitoring, with at least one ultrasonic sensor, an outdoor environment for audible sounds;
   converting, by the at least one ultrasonic sensor, an audible sound into an electrical signal;
   processing, by a neural network trained to perform classification with respect to a plurality of classes, the electrical signal in order to classify a source of the audible sound as pertaining to a first class of the plurality of classes;
   analyzing, by a computer system, the electrical signal to estimate at least one of a relative position and a relative velocity corresponding to the source; and
   assigning, by the computer system, a priority to the source based on at least one of the first class, the relative position, and the relative velocity.

2. The method of claim 1, wherein the at least one ultrasonic sensor is carried onboard a first vehicle.

3. The method of claim 2, further comprising tracking the source when the priority is above a threshold and not tracking the source when the priority is below the threshold.

4. The method of claim 3, wherein tracking comprises monitoring the relative position of the source with respect to the first vehicle.

5. The method of claim 1, wherein assigning the priority to the source further comprises assigning the priority based on at least one of current traffic conditions, behavior policies, and expectations of objects.

6. The method of claim 5, wherein the priority assigned by the computer system to the source changes over time.

7. The method of claim 2, further comprising communicating at least one of the first class, the relative position, and the relative velocity to a second vehicle.

8. The method of claim 7, wherein the communicating comprises sending the at least one of the first class, the relative position, and the relative velocity directly from the first vehicle to the second vehicle via wireless communication.

9. The method of claim 1, further comprising generating a confidence score for at least one of the relative position and the relative velocity.

10. The method of claim 9, wherein the confidence score is based at least partially on information received from at least one of another sensor type and a remotely-located ultrasonic sensor.

11. A system comprising:
an ultrasonic sensor;
at least one processor; and
at least one memory device operably connected to the at least one processor and storing instructions for execution by the at least one processor, the instructions causing the at least one processor to:
receive an electrical signal from the ultrasonic sensor, wherein the electrical signal is generated by the ultrasonic sensor in response to the ultrasonic sensor receiving an audible sound emanating from a source,
process, using a neural network trained to perform classification with respect to a plurality of classes, the electrical signal in order to classify the source as pertaining to a first class of the plurality of classes,
analyze the electrical signal to estimate at least one of a relative position and a relative velocity corresponding to the source, and
assign a priority to the source based on at least one of the first class, the relative position, and the relative velocity.

12. The system of claim 11, wherein the at least one ultrasonic sensor is carried onboard a first vehicle.

13. The system of claim 11, wherein the instructions further cause the at least one processor to track the source when the priority is above a threshold and not track the source when the priority is below the threshold.

14. The system of claim 13, wherein to track the source is to monitor the relative position of the source with respect to the first vehicle.

15. The system of claim 11, wherein to assign the priority to the source is to assign the priority based on at least one of current traffic conditions, behavior policies, and expectations of objects.

16. The system of claim 15, wherein the priority assigned to the source changes over time.

17. The system of claim 12, wherein the instructions further cause the processor to communicate at least one of the first class, the relative position, and the relative velocity to a second vehicle.

18. The system of claim 11, wherein to communicate the at least one of the first class, the relative position, and the relative velocity to the second vehicle is to communicate the at least one of the first class, the relative position, and the relative velocity directly to the second vehicle via wireless communication.

* * * * *